United States Patent [19]

Distler et al.

[11] 4,350,531

[45] Sep. 21, 1982

[54] PRINTING PASTES WITH FOAM INHIBITORS

[75] Inventors: Harry Distler, Bobenheim; Rudi Widder, Leimen; Guenter Uhl, Worms, all of Fed. Rep. of Germany

[73] Assignee: BASF Aktiengesellschaft, Ludwigshafen, Fed. Rep. of Germany

[21] Appl. No.: 298,354

[22] Filed: Sep. 1, 1981

[30] Foreign Application Priority Data

Sep. 4, 1980 [DE] Fed. Rep. of Germany ....... 3033276

[51] Int. Cl.$^3$ ............................................. C09D 11/02
[52] U.S. Cl. ....................................... 106/19; 106/20; 524/145
[58] Field of Search ................................... 106/19, 20; 260/29.6 MP; 521/909

[56] References Cited

U.S. PATENT DOCUMENTS 4,083,907 4/1978 Hamilton .............................. 106/20

FOREIGN PATENT DOCUMENTS 561322 2/1969 Switzerland .

*Primary Examiner*—John Kight, III
*Assistant Examiner*—Amelia B. Yarbrough
*Attorney, Agent, or Firm*—David L. Hedden; Joseph D. Michaels

[57] ABSTRACT

The subject invention relates to the use of foam inhibitors in printing pastes based on oil-in-water emulsions or aqueous emulsions. The foam inhibitors are mixtures of monoalkyphosphates and aliphatic esters or high boiling hydrocarbons.

8 Claims, No Drawings

PRINTING PASTES WITH FOAM INHIBITORS

BACKGROUND OF THE INVENTION

1. Field of the Invention

The subject invention relates to the use of foam inhibitors in printing pastes which are oil-in-water emulsions or aqueous emulsions. The foam inhibitors are mixtures of (a) monoalkylphosphates with (b) aliphatic esters or high boiling hydrocarbons.

2. Description of the Prior Art

Printing pastes of all types tend to foam more or less during printing particularly when they contain dispersing and/or emulsifying agents which is usually the case. The foaming must be prevented by the addition of foam inhibitors if uniform and sharp prints are to be obtained. Several such agents are known, for instance, fatty acid esters of alkyl ethers (see German Pat. No. 2,114,609 and German Published Application No. 2,143,988). However, it is difficult to reproduce them on an industrial scale and products are, therefore, obtained with varying foam inhibiting effects. Silicone-based foam inhibitors are also used but they are not satisfactory in every respect.

Swiss Pat. No. 561,322 describes esters of carboxylic acid with 4 to 18 carbon atoms respectively in the alkyl radical of the alcohol and the acid, preferably in mixtures with tris-$C_{4-8}$-alkyl phosphates, particularly tributyl phosphate, as foam inhibitors in optical brighteners of synthetic fibers. The use of these foam inhibitors in printing pastes is not possible. If triisobutylphosphate is used in printing pastes with oil-in-water emulsion based thickeners, they are absorbed into the oil phase rendering it worthless, and if used in pigment printing pastes, the triisobutylphosphate acts like a plasticizer upon the binder so that the print has a tacky texture and even becomes sticky when larger quantities are used. Moreover, higher trialkyl phosphates such as trioctyl phosphate are difficult to obtain and cannot be procured in the market place at least not on an industrial scale.

Because of the problems associated with using these foam inhibitors, there is a need to develop foam inhibitors for textile printing which overcome the described drawbacks of the known defoamers and are easily accessable.

SUMMARY OF THE INVENTION

This invention relates to foam inhibitors used in printing pastes. The foam inhibitors comprise (a) a liquid solution of 0.1 to 50, preferably 1 to 20 percent by weight, relative to the weight of the foam inhibitor, of a monoalkyl phosphate having 10 to 20, preferably 16 to 18 carbon atoms in the alkyl radical; and (b) from 50 to 99.9, preferably 80 to 99 percent by weight, relative to the weight of the foam inhibitor, of an aliphatic ester having a molecular weight of 200 to 800, preferably 300 to 600, or an aliphatic hydrocarbon boiling above 100° C., preferably above 120° C. The amount of foam inhibitor agent used is from 0.05 to 5 percent, preferably 0.1 to 0.5 percent by weight, relative to the total weight of the printing paste.

The foam inhibiting effect of the mixture is synergistic in that the foam inhibition is unexpectedly greater than what would be predicted by reviewing data related to the foam inhibiting effect of the individual components. Moreover, the components are products which are produced on an industrial scale, are easily available, and do not have a detrimental effect upon the handling of the print. Furthermore, service life, color yields, as well as the brilliancy and stability of the printing paste are not impaired by the use of the foam inhibitors.

The printing paste containing the foam inhibitor is suited for printing on textiles of all natural and synthetic fibers as well as for paper and fleeces.

DESCRIPTION OF THE PREFERRED EMBODIMENT

Monoalkyl phosphates which can be used as one ingredient of the foam inhibitors include the monophosphate of n- and i-decanyl, -dodecanyl, -tridecanyl, cetyl- and stearyl alcohol. Of course, the industrial monoalkylphosphates also contain quantities of corresponding di- and triphosphates. These neither disturb nor contribute to the foam inhibiting effect to any extent worth mentioning.

Aliphatic esters which are used as an ingredient of the foam inhibitors have molecular weights of 200 to 800. The acid and the alcohol used to prepare the esters independently of each other may be straight chained or branched, and may contain 1 to 20 carbon atoms. The sum of the carbon atoms of the alcohol and acid radicals must be at least 12. The ester grouping may be contained in the esters once or several times. Preferably used as acids for preparing the esters are saturated acids such as stearic acid and 2-ethylhexanoic acid. However, other suitable acids include those having olefinically unsaturated acid components such as oleic acid, particularly natural mixtures of saturated and unsaturated fatty acids as found in plant and animal fats and oils, as well as hydroxyl-substituted acids, for instance, citric acid. Also short-chained carboxylic acids such as propionic and acetic acid and even formic acid may be used. Alcohols which may be used to prepare the esters are lower alcohols, as far down as methanol. Used on a preferred basis, however are higher alcohols with 8 to 18 carbon atoms such as 2-ethylhexanol, n- and i-decanol, tridecanol and stearyl alcohol. Multi-functional alcohols are less well suited. Glycerides such as animal or plant oils, for instance, would have a negative effect upon the hand of the prints.

Specific examples of esters which can be used include dodecylformeate, decylacetate, tris-tridecylcitrate, tris-(2-ethylhexyl) citrate 2-ethylhexyl ester of 2-ethylhexanoic acid, preferably stearic acid-i-decyl and -tridecyl ester. All of these substances have in common the fact that their physical and chemical properties are dominated by the hydrocarbon component of the molecule so that they resemble the pure aliphatic hydrocarbons.

Aliphatic hydrocarbons which may be used as an ingredient of the foam inhibitors have boiling points above 100° C. and may be of natural (crude oil) as well as synthetic origin (for instance, those produced by Fischer-Tropsch process). They may be straight-chained or branched, and usually are mixtures. The molecular weight of the hydrocarbons which can be used is limited at the lower level by the requirement that the minimum boiling point under normal pressure is above 100° C. and at the upward level by the condition that they must be liquid at room temperature, at least in mixture with the monoalkyl phosphates. Gasoline with an appropriate boiling range may also be used even though it contains aromatic components in a subordinate quantity.

In addition to the foam inhibitors, the printing pastes made in accordance with this invention contain other ingredients normally used in formulating printing paste. Usually, in addition to other auxiliaries, every printing paste contains approximately 1 to 20 percent by weight of a dye or a pigment, and in the latter case, approximately 3 to 25 percent of at least one binder as well as 0.05 to 15 percent by weight of at least one thickening agent dissolved in water, and/or 10 to 90 percent by weight, always relative to the total amount of printing paste, of a thickener emulsion as well as up to 1.5 percent by weight of a dispersing agent.

As a rule, the binder consists of a cross-linkable mixed polymerizate, for instance, based upon vinyl ketones, vinyl esters, vinyl ethers, esters of maleic and fumaric acid, styrene, vinyl chloride, vinylidene chloride, acrylonitrile, and particularly methacrylic acid esters, butadiene, and N-methylol group, N-methylol ether group, or halohydrin group containing monomers. These mixed polymerizates may also contain groups which render the mixture water-soluble and which have a thickening effect in the aqueous phase such as neutralized carboxylic acid groups, or they may be used together with polymerizates or mixed polymerizates containing such groups. Well proven binders are described, for instance, in German Pat. Nos. 1,140,890, 1,257,736 and 1,619,661.

Possible thickeners include aqueous solutions of predominantly modified natural or synthetic high polymers such as sodium algenate, carboxymethyl cellulose, starch and meal ether, or carboxylic acid group containing polymerizates and/or oil-in-water emulsion thickeners usually containing heavy gasoline.

Other commonly used printing auxiliaries which may or, under certain circumstances, must be used include dispersing agents for pigments, and emulsifiers for heavy gasoline. These include the commonly used anionic or nonionic surfactants such as lignin sulfonates, condensation products of formaldehyde with phenol- and/or naphthlenesulfonic acids, sulfomethylation products of phenols and polyvinyl alcohol sulfates, and/or ethoxylated alkylphenols or ethoxylated fatty alcohols with HLB (hydrophilic-liphophilic balance) values between approximately 2 and 17; catalysts for curing the binder (usually acid or acid salts); moisture retention agents (glycerine, glycol, urea) substances which vary the handling (for instance, silicone oil); dyeing auxiliaries (so called carriers as well as equalizing auxiliaries); wetting agents (for instance, water-soluble alcohols); and recrystallization prevention agents. The quantities used may vary greatly from case to case. Those skilled in the art are familiar with these variations and thus further explanation is not required.

The finished printing paste is obtained by simply mixing the components. The production of the oil-in-water emulsion requires intensive stirring.

The examples which follow will illustrate more specifically the practice of this invention. The parts and percentages referred to in the examples are by weight.

EXAMPLE 1

The following ingredients are combined and homogenized:

30 parts of a 30 percent pigment paste (C.I. 12485),
115 parts of a highly viscous 6 percent aqueous preparation of acidic polyacrylic ammonium having a molecular weight of approximately 4,000,000,
150 parts of a 45 percent aqueous dispersion of a mixed polymerizate consisting of 67 parts of butadiene, 29 parts of styrene, and 4 parts of N-methylol acrylamide,
700 parts of water, and
5 parts of a paraffin oil having a boiling point of 190° to 250° C. which contains 15 percent monostearylphosphate.

The resultant printing paste can be used without interfering foam formation even on fast machines such as Rouleaux printing machines. As a result, the print quality is good even if larger quantities of fabrics are continuously printed over an extended period of time.

For comparison purposes, the foam inhibiting effect of several other compositions was tested according to the frothing method (DINF 53 902, page 1). The following substances were tested:

A. the described printing paste without any foam inhibiting additive (blank sample);

B. same as A, but with 4.25 grams of the paraffin oil used in Example 1 per kilogram of printing paste;

C. same as A, but with 0.75 gram of monostearyl phosphate per liter;

D. printing paste with both of the additives used in A and B, that is with 5 grams per kilogram of a 15 percent solution of monostearylphosphate in the referenced paraffin oil.

For the test, the printing paste in each case was diluted in a weight ratio of 5 parts of paste to 7 parts of water. Experience shows that the foam inhibiting values thus obtained are directly comparable with the effect produced by the printing machine.

The figures in Table I below represent the respective resultant milliliters of foam.

TABLE I

|  | A | B | C | D |
|---|---|---|---|---|
| Immediately | 120 | 120 | 50 | 0 |
| After 30 seconds | 120 | 120 | 45 | 0 |
| After 60 seconds | 120 | 120 | 40 | 0 |
| After 120 seconds | 120 | 120 | 40 | 0 |

Table I illustrates the synergistic effect of combining monostearyl phosphate with paraffin oil.

EXAMPLE 2

In a suitable mixing vessel, 132 parts of water are mixed with 50 parts of a 6 percent aqueous solution of sodium algenate. This is then mixed with 50 parts of a 20 percent aqueous solution of a $C_{16-18}$-fatty alcohol which has been reacted with 25 moles of ethylene oxide.

Thereafter, 3 parts of a high boiling mixture of aliphatics containing 20 percent monostearylphosphate are stirred in. Subsequently, 620 parts of gasoline (boiling point 140° to 200° C.) are slowly emulsified into this mixture at approximately 3000 rpm. While the mixture is stirred more slowly, 120 parts of a 40 percent aqueous dispersion of a mixed polymerizate consisting of 65 parts of n-butyl acrylate, 20 parts acrylonitrile, 10 parts styrene, 1 part acrylamide and 4 parts of N-methylolacrylamide and 25 parts of a 30 percent aqueous color (dye) paste (C.I. 60005) are added.

This resulting mixture is a printing paste of the oil-in-water type which does not result in any foam formation during processing and thus results in an optimum print.

EXAMPLE 3

A thickener is prepared by mixing the following ingredients:

400.0 parts of an 8 percent aqueous solution of a commercially available meal ether,
200.0 parts of a 10 percent aqueous solution of a commercially available starch ether,
7.0 parts of oleic acid-diethanolamide (fixing auxiliary),
10.0 parts sodium-m-nitrobenzenesulfonate,
2.5 parts of a citric acid-tri-i-decyl ester containing 15 percent of monotallophosphate and
380.5 parts of water.

ponents, and with aqueous solutions of emulsifiers with respect to foam formation in accordance with the frothing method (DIN 53902 page 1).

Table II which follows provides the data showing the effect of various combinations on aqueous solutions of emulsifiers. Table II shows the synergistic effect of combining the monoalkyl phosphates and aliphatic esters or hydrocarbons as described in the subject invention.

TABLE II

| Emulsifier (0.5% Aqueous Solution) | | Without Additives (Blank Sample) | Inhibitor (2 Grams per Liter of Emulsifier Solution) | | | |
|---|---|---|---|---|---|---|
| | | | Mono-Stearyl Phosphate 10% in Water | Paraffin Oil Boiling Point 190–250° C. | Mono-Stearyl Phosphate - 10% in Paraffin Oil | Citric Acid-Tri-i-Nonyl-Ester |
| oleyl alcohol + 20 moles ethylene oxide | Immediately | 555 | 245 | 375 | 100 | 245 |
| | After 30 sec | 545 | 235 | 375 | After 2 sec 0 | 235 |
| | After 60 sec | 540 | 225 | 365 | | 230 |
| | After 120 sec | 540 | 190 | 325 | | 100 |
| i-nonylphenol + 20 moles ethylene oxide | Immediately | 600 | 185 | 550 | 50 | 390 |
| | After 30 sec | 600 | 150 | 535 | After 2 sec 0 | 360 |
| | After 60 sec | 600 | 120 | 510 | | 300 |
| | After 120 sec | 600 | 70 | 475 | | 185 |
| Sodium Salt of Sulfuric Acid Half-Ester of a 20 mole ethoxylated i-octylphenol | Immediately | 600 | 305 | 525 | 50 | 310 |
| | After 30 sec | 600 | 285 | 525 | After 6 sec 0 | 180 |
| | After 60 sec | 570 | 275 | 520 | | 135 |
| | After 120 sec | 570 | 215 | 500 | | 80 |

| Emulsifier (0.5% Aqueous Solution) | | Inhibitor (2 Grams per Liter of Emulsifier Solution) | | | | |
|---|---|---|---|---|---|---|
| | | Mono-Stearyl Phosphate - 10% in Citric Acid-Tris-i-nonylester | 2-Ethyl Hexanoic Acid-2-Ethyl-hexylester | Mono-Stearyl Phosphate - 10% in 2-Ethylhexanoic Acid-2-Ethylhexyl Ester | Oleic Acid-i-Decyl Ester | Mono-Stearyl Phosphate - 10% in Oleic Acid-i-Decyl-Ester |
| Oleyl alcohol + 20 moles ethylene oxide | Immediately | 50 | 350 | 150 | 460 | 50 |
| | After 30 sec | After 1 sec 0 | 320 | After 12 sec 0 | 455 | After 3 sec 0 |
| | After 60 sec | | 305 | | 455 | |
| | After 120 sec | | 270 | | 435 | |
| i-Nonylphenol + 20 moles ethylene oxide | Immediately | 117 | 485 | 133 | 413 | 117 |
| | After 30 sec | After 3 sec 0 | 470 | After 10 sec 0 | 413 | After 3 sec 0 |
| | After 60 sec | | 460 | | 410 | |
| | After 120 sec | | 395 | | 370 | |
| Sodium Salts of the Sulfuric Acid Half-Ester of a 20 mole ethoxylated i-Octylphenol | Immediately | 45 | 485 | 135 | 353 | 107 |
| | After 30 sec | After 8 sec 0 | 485 | After 7 sec 0 | 353 | After 2 sec 0 |
| | After 60 sec | | 475 | | 335 | |
| | After 120 sec | | 445 | | 270 | |

After mixing, the pH is adjusted to value of 5.5 using citric acid. A printing paste is then prepared by mixing 40 parts of a 20 percent aqueous processed mixture of a commercially available dispersion dye (C.I. Disperse Blue 148) with 960 parts of the thickener.

The result is processable printing paste which can be easily processed and does not foam even when subjected to pronounced stress by fast-running printing machines.

EXAMPLE 4

A printing paste is prepared by mixing 600 parts of a 3 percent sodium-alginate thickener in water, 100 parts of urea, 10 parts of sodium-m-nitrobenzene sulfonate, and 20 parts of soda. Then the mixture is adjusted to printing viscosity with 238 parts of water Following this, 2 parts of a stearic acid-i-decyl ester containing 20 percent monotridecylphosphate, and 30 parts of a 100 percent powdered commercially available reaction dye (reactive blue 72) are stirred into the mixture.

The resulting paste does not foam when used on printing machines.

COMPARISON EXAMPLES

A. Foam Inhibitors Used in Aqueous Emulsifiers

Several combinations in accordance with this invention were tested and compared with the individual components, and with aqueous solutions of emulsifiers with respect to foam formation in accordance with the frothing method (DIN 53902 page 1).

B. Foam Inhibitors used in Printing Paste

Various foam inhibitors were added to a printing paste base (which is a printing paste without dye). The base was prepared by mixing 3.5 parts of ethylene-maleic acid anhydride-mixed polymerizate in a mole ratio of 1:1 having a molecular weight above 500,000,
2.5 parts of 25 percent aqueous ammonium solution,
5 parts of a 45 percent aqueous disperison of a mixed polymerizate consisting of
  67 percent butylacrylate,
  29 percent styrene, and
  4 percent N-methylol-acrylamide, and
914 parts of water.

To the base was added 0.25 percent of various foam inhibitor combinations. The mixture of base and inhibitor was diluted with water to such an extent that it could be tested easily in accordance with the frothing method (DIN 53 902, page 1) and the mixtures were tested. The results are shown in Table III which follows. Table III illustrates the synergistic effect of combining the monoalkyl phosphate with either an aliphatic ester or aliphatic hydrocarbon as described in the subject invention.

TABLE III

| | Immediately | After 30 sec | After 60 sec | After 120 sec |
|---|---|---|---|---|
| Without addition (blank sample) | 175 | 175 | 175 | 174 |
| Paraffin oil, boiling point 190–250° C. | 103 | 103 | 103 | 103 |
| Monostearyl phosphate - 10% in water | 115 | 115 | 115 | 115 |
| Monostearyl phosphate - 50% in paraffin oil | 10 | 0 (after 1 sec.) | | |
| Monostearyl phosphate - 10% in paraffin oil | 10 | 0 (after 5 sec.) | | |
| Monostearyl phosphate - 2.5% in paraffin oil | 10 | 0 (after 5 sec.) | | |
| Monostearyl phosphate - 1% in paraffin oil | 10 | 0 (after 6 sec.) | | |
| Monostearyl phosphate - 0.5% in paraffin oil | 43 | 40 | 40 | 40 |
| Stearic acid-i-decyl ester | 117 | 117 | 117 | 117 |
| Monostearyl phosphate - 50% in stearic acid-i-decyl ester | 0 | | | |
| Monostearyl phosphate - 10% in stearic acid-i-decyl ester | 0 | | | |
| Monostearyl phosphate - 2.5% in stearic acid-i-decyl ester | 0 | | | |
| Monostearyl phosphate - 1% in stearic acid-i-decyl ester | 0 | | | |
| Monostearyl phosphate - 0.5% in stearic acid-i-decyl ester | 0 | | | |

The embodiments of the invention in which an exclusive privilege or property is claimed are defined as follows:

1. In a printing paste composition containing a binder, water, a thickener, a foam inhibitor, and other optional ingredients, the improvement which comprises using as the foam inhibitor from 0.05 to 5 percent by weight, relative to the total weight of the printing paste, of a mixture comprising
    (a) a liquid solution of 0.1 to 50 percent by weight, relative to the weight of the foam inhibitor, of a monoalkyl phosphate having 10 to 20 carbon atoms; and
    (b) from 50 to 99.9 percent by weight, relative to the weight of the foam inhibitor, of a compound selected from the group consisting of aliphatic esters having a molecular weight of 200 to 800, aliphatic hydrocarbons having a boiling point above 100° C., and mixtures thereof.

2. The printing paste of claim 1 wherein component (a) is monostearyl phosphate.

3. The printing paste of claim 2 wherein component (b) is selected from the group consisting of paraffin oil having a boiling point of 190° C. to 250° C., citric acid tri-i-nonyl ester, oleic acid i-decyl ester, and 2-ethylhexanoic acid-2-ethylhexyl ester.

4. The printing paste of claim 1 wherein the amount of component (a) used is from 1 to 20 percent by weight and the number of carbon atoms in the alkyl radical of the monoalkyl phosphate is from 16 to 18.

5. The printing paste of claim 4 wherein the amount of component (b) is from 80 to 99 percent by weight, relative to the weight of the foam inhibitor.

6. The printing paste of claim 5 wherein an aliphatic ester having a molecular weight of 300 to 600 is used as component (b).

7. The printing paste of claim 5 wherein an aliphatic hydrocarbon having a boiling point above 120° C. is used as component (b).

8. The printing paste of claim 1 wherein the total amount of foam inhibitor used is from 0.1 to 0.5 weight percent, relative to the total weight of the printing paste.

* * * * *